INVENTOR.
ROBERT E. EASTMAN
KARL HINRICHS
JOHN R. KOLDEN
BY Samuel B. Stone
ATTORNEY

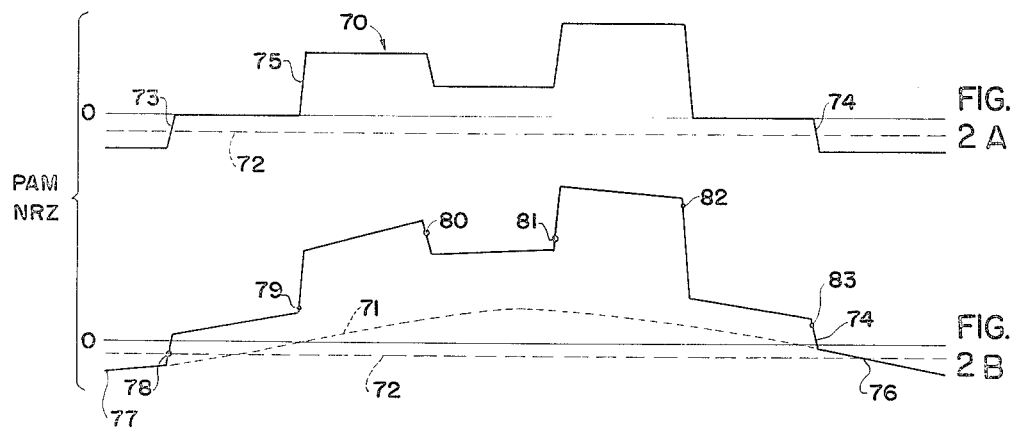
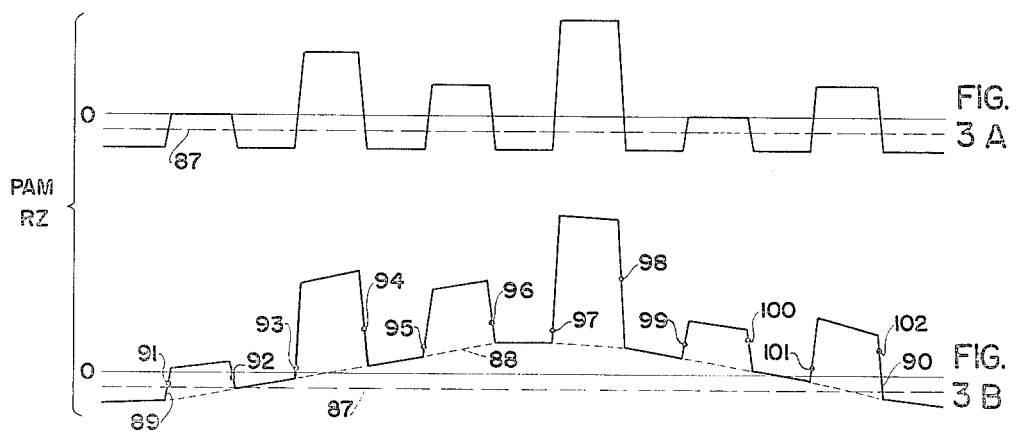
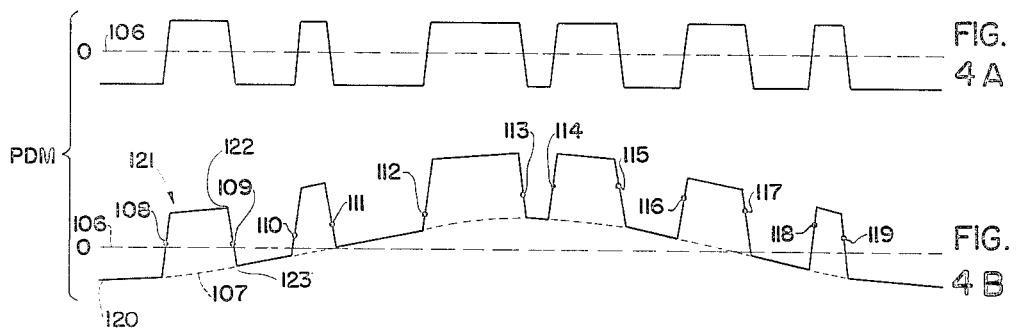

INVENTOR.
ROBERT E. EASTMAN
KARL HINRICHS
JOHN R. KOLDEN
BY
Samuel B. Stone
ATTORNEY

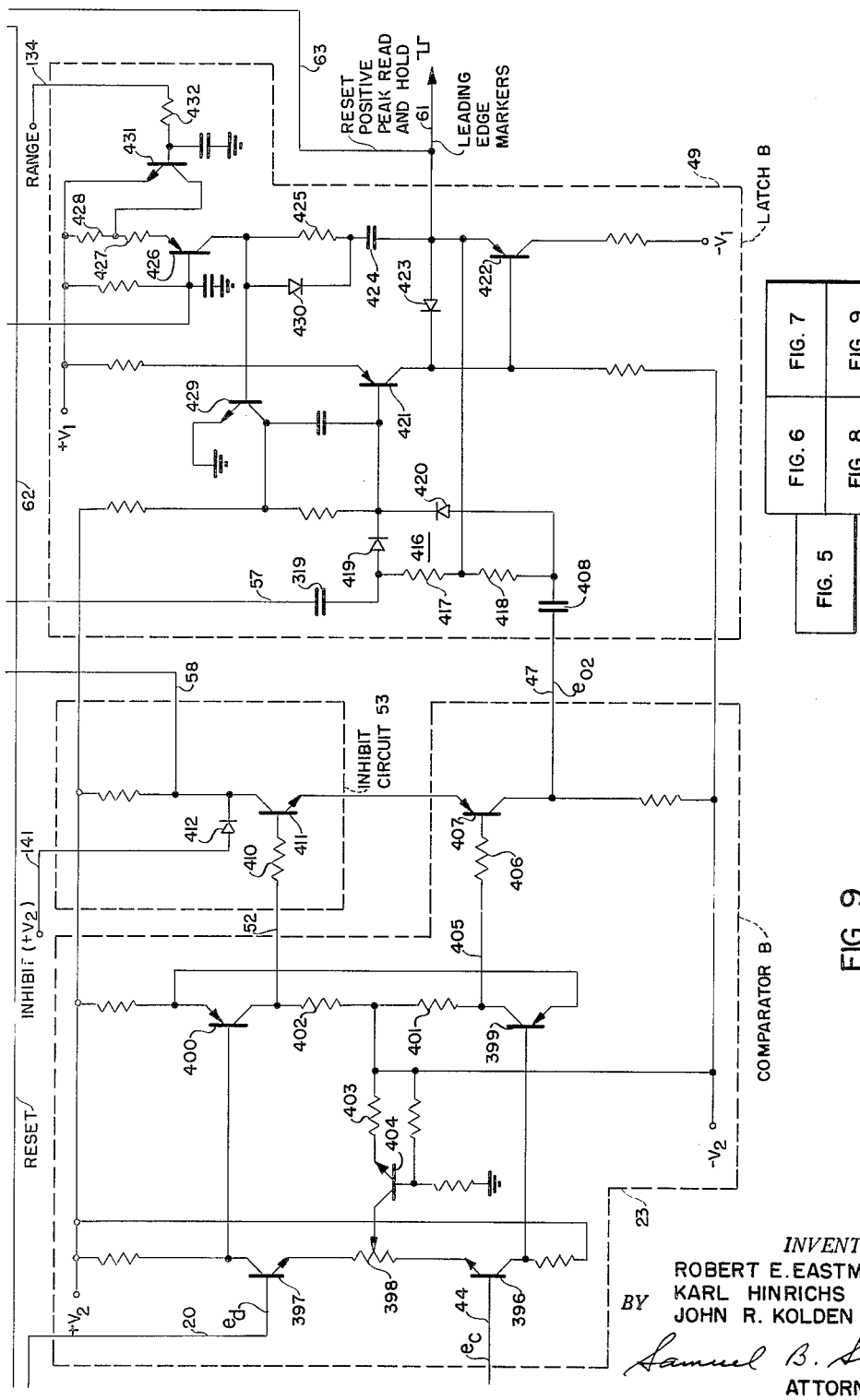

United States Patent Office 3,225,213
Patented Dec. 21, 1965

3,225,213
TRANSITION DETECTOR
Karl Hinrichs and Robert E. Eastman, Fullerton, and John R. Kolden, Riverside, Calif., assignors to Beckman Instruments, Inc., a corporation of California
Filed May 18, 1962, Ser. No. 195,695
5 Claims. (Cl. 307—88.5)

The present invention relates to a device for detecting desired signal transitions and more particularly for accurately detecting transitions of a signal which is contaminated by disturbances, noise, etc., which tend to degrade the signal.

When operating with telemetry data, such as, pulse-amplitude-modulated and pulse-duration-modulated signals, it is necessary to detect particular signal transitions, such as, the transition of a pulse from a negative value to a positive value, or vice versa. A train of telemetry data may result from sampling a plurality of signals produced by transducers, and the like. Equipment which must utilize or operate on this data must be synchronized with the data signals in order to properly utilize these signals. Synchronization may be obtained by detecting the leading and/or trailing edges of pulses in the data train and providing output signals or markers indicative of the time of occurrence of these edges.

Previously, signal transitions have been detected by establishing a fixed slicing level, or threshold level, which is a fixed percentage of the maximum signal excursion to be encountered, or a predetermined magnitude above a particular reference level. A fixed threshold level may be provided by synchronously or asynchronously clamping pulses in a data train to a reference value and detecting any transition which occurs at the fixed threshold level. For example, all signal transitions occurring above a reference level and at a percentage (such as 10%) of maximum pulse amplitude may be detected.

Signal transitions may be detected accurately by utilizing a fixed threshold when the data signals are uncontaminated by disturbances and noise, and when the signals have an ideal rise time. However, when operating with pulses which have various slopes because of excessive filtering and low frequency disturbances and noise, the use of a fixed threshold level can introduce appreciable errors. When using pulse-duration-modulated (PDM) signals, the amplitude is known and generally a threshold of 50% of the pulse amplitude is utilized. However, when low frequency disturbances are present some signal transitions may not be accurately detected. Similar inaccuracies arise when operating with pulse-amplitude-modulated (PAM) signals where, generally, the threshold is a particular magnitude above a reference level. The problem in accurately detecting signal transitions is even more acute when dealing with PAM non-return-to-zero (PAM-NRZ) signals since the trailing edges of the pulses do not necessarily return to zero. With these signals there are transitions which are not detected when utilizing a fixed slicing level even in the absence of signal contamination.

According to a feature of the present invention, a transition detector is provided in which variable threshold levels are utilized in detecting signal transitions thereby eliminating the inaccuracies and errors caused by signal contamination.

Another feature of the present invention is the provision of a transition detector in which positive and negative peaks of signals are detected and utilized to establish subsequent thresholds.

A further feature of the present invention is the establishment of threshold levels for determining signal transitions wherein the threshold levels are based on previous signal excursions rather than on a fixed reference level or percentage of maximum signal excursion.

An additional feature of the present invention is the provision of variable threshold levels for detecting signal transitions, and in providing different threshold levels for PDM and PAM signals.

In an illustrative embodiment of a transition detector constructed in accordance with the teachings of the present invention, positive and negative peak read and hold circuits are provided which receive the data signals and store the positive and negative peak values of the individual pulses in the data signal train. The data signals also are applied through a threshold control circuit which serves to pass the signals without alteration, or to add to or subtract from the signals predetermined threshold values. The outputs of the threshold control circuit are applied to inputs of first and second comparators. Predetermined potentials may be added to or subtracted from the stored positive and negative peak values of the pulses, and the resulting signals, or a combination thereof, are applied to the comparators by respective function switches.

The comparators each provide output signals to trigger latch circuits when the transitions of the input signals pass predetermined threshold levels. The output of one of the comparators triggers one of the latch circuits to provide leading edge markers when a signal transition goes more positive than a particular threshold, and the output of the other comparator triggers the other latch circuit to provide trailing edge markers when a signal transition goes more negative than a particular threshold value. When the markers are produced, the positive and negative peak read and hold circuits are reset to enable them to read and store new positive and negative peak values. In one particular mode of operation (PAM–NRZ), both latch circuits are triggered upon the occurrence of a predetermined output from either of the comparators. The threshold control circuit and function switches are operated to provide different threshold levels for different types of input signals.

Other features and objects of the invention will be better understood from a consideration of the following detailed description when read in conjunction with the attached drawings in which:

FIGS. 2a and 2b are PAM–NRZ curves shown respectively without and with low frequency disturbance;

FIGS. 3a and 3b illustrate PAM–RZ curves respectively without and with low frequency disturbance;

FIGS. 4a and 4b illustrate PDM signals respectively without and with low frequency disturbance; and FIGS. 5 through 9, when arranged as shown in FIG. 10, illustrate a detailed circuit diagram of the exemplary transition detector shown in block diagram form in FIG. 1.

Figure 1:
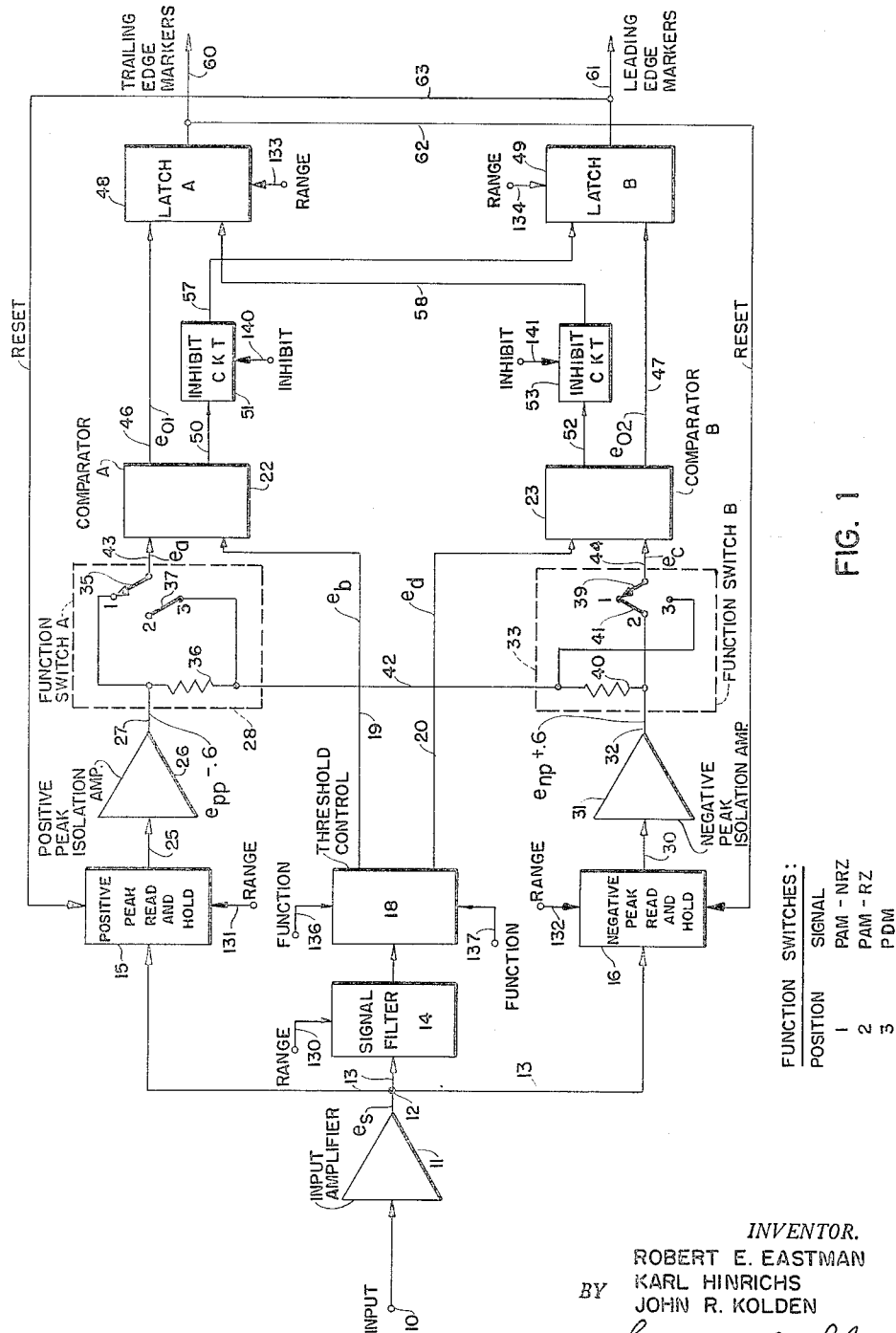
FIG. 1 is a block diagram of a transition detector constructed in accordance with the teachings of the present invention.

A transition detector utilizing the concepts of the present invention first will be described with reference to the over-all block diagram shown in FIG. 1 and the exemplary data curves illustrated in FIGS. 2 through 4. Input data signals are applied to an input terminal 10 and in turn applied through a unity gain input amplifier 11 to a terminal 12. The input amplifier 11 serves to isolate the source of the data signals from the remainder of the components in the transition detector in FIG. 1. For the purposes of discussion, the signal appearing at the terminal 12 will be termed $e_s$. The signal $e_s$ is applied through a line 13 to a signal filter 14, a positive peak read and hold circuit 15 and a negative peak read and hold circuit 16. The signal $e_s$ is filtered in the signal filter 14 to take out high frequency spikes, and similar disturbances which may be introduced by the operation of the positive and negative peak read and hold circuits 15 and 16, respectively.

The output of the signal filter 14 is applied to a threshold control circuit 18. Depending upon the particular mode of operation (PDM, PAM–RZ or PAM–NRZ) the the threshold control circuit 18 serves to pass the signal $e_s$ or to add or subtract a particular reference voltage from the signal $e_s$ for purposes which will be described in greater detail subsequently. The threshold control circuit 18 provides output signals on lines 19 and 20, and these signals are termed $e_b$ and $e_d$, respectively. The signal $e_b$ is applied through the line 19 to a comparator A denoted by the reference numeral 22. The signal $e_d$ is applied through the line 20 to a comparator B denoted by the reference numeral 23.

The signal $e_s$ from the input amplifier 11 is applied to the positive peak read and hold circuit 15 as discussed previously, and this circuit functions to follow the positive peaks of the signal $e_s$ and hold, or store, these peak values. In the illustrative circuit diagram of the positive peak read and hold circuit 15 in FIG. 6 which will be discussed in detail subsequently, a capacitor is employed for the purpose of storing the peak value of the signal $e_s$. Hence, the output of the positive peak circuit 15 is equal to the positive peak magnitude of a pulse in the signal $e_s$. The signal from the positive peak circuit 15 is termed $e_{pp}$. The output of the positive peak circuit 15 is applied through a line 25 to a positive peak isolation amplifier 26. The amplifier 26 functions to isolate the positive peak circuit 15 from the remainder of the circuit and, also, serves to subtract a particular voltage from the signal $e_{pp}$ as will be described in greater detail hereinafter. The output of the amplifier 26 is applied through a line 27 to a function switch A denoted by the reference numeral 28.

The signal $e_s$ also is applied through the line 13 to the negative peak read and hold circuit 16. The negative peak circuit 16 functions in the same manner as the positive peak circuit 15, except the negative peak circuit 16 functions to read and hold, or store, the negative peak values of the pulses in the signal $e_s$. The output of the negative peak circuit 16, termed signal $e_{np}$, is applied through a line 30 to a negative peak isolation amplifier 31. The amplifier 31 isolates the negative peak circuit 16 from the remainder of the circuit and, also, serves to add a fixed voltage to the signal $e_{np}$ for purposes to be described in greater detail subsequently. The output of the amplifier 31 is applied through a line 32 to a function switch B denoted by the reference numeral 33.

The function switches A and B are utilized to select different modes of operation for PAM–NRZ signals, PAM–RZ signals and PDM signals. The function switches A and B are illustrated as mechanical switches for simplicity of illustration. However, electronic switches are preferred in order to provide more flexible operation and higher speed, and such switches are illustrated in the detailed circuit diagram in FIGS. 5 through 9 and will be discussed subsequently. The function switch A includes a three position switch and an arm 35 to select one of the three contacts. The line 27 from the amplifier 26 is connected directly to the first contact, and through a resistance 36 to the third contact. The second and third contacts are connected by a line 37. The function switch B likewise includes a three position switch and an arm 39 which may be selectively connected with any one of the three contacts. The line 32 from the amplifier 31 is directly connected to the second contact, and is connected through a resistance 40 to the third contact. The first and second contacts are connected together by a line 41. The third contacts of each of the function switches A and B are connected together through a line 42. The arm 35 of the function switch A is connected to a line 43 to supply a signal, termed signal $e_a$, to the comparator 22. The arm 39 of the function switch B is connected to a line 44 to supply a signal $e_c$ to the comparator 23.

The comparator 22 compares the signals $e_a$ and $e_b$ on the respective lines 43 and 19 to provide an output signal, termed $e_{01}$, on an output line 46. The signal $e_{01}$ is the difference between the input signals $e_a$ and $e_b$. Likewise, the comparator 23 compares the signals $e_c$ and $e_d$ on the respective lines 44 and 20 to provide an output signal $e_{02}$ on a line 47. The signal $e_{02}$ is the difference between the input signals $e_c$ and $e_d$. The signal $e_{01}$ on the line 46 is applied directly to a latch circuit A denoted by the reference numeral 48. The signal $e_{02}$ on the line 47 is applied directly to a latch circuit B denoted by the reference numeral 49. The comparator 22 also supplies a signal on a line 50 to an inhibit circuit 51. The comparator 23 likewise supplies a signal on a line 52 to an inhibit circuit 53. When the inhibit circuit 51 is not inhibited, the signal on the line 50 is applied through the inhibit circuit and a line 57 to the latch circuit B. The signal on the line 57 is the complement of the signal on the line 46. In a similar manner the inhibit circuit 53 supplies a complement signal on the line 58 to the latch circuit A when the inhibit circuit 53 is not inhibited. As will be explained in greater detail subsequently, the inhibit circuits 51 and 53 are inhibited when the transition detector is detecting the transitions of PAM–RZ and PDM signals.

The latch 48 is triggered whenever a negative-going signal appears at either of its inputs. When the latch 48 is triggered, it provides a trailing edge marker on an output line 60. The trailing edge markers are signals indicative of the trailing edges of the pulses applied to the input 10 of the transition detector. In a similar manner, the latch 49 is triggered by a positive-going signal on either of its inputs. When the latch 49 is triggered, it provides leading edge markers on an output line 61. These leading edge markers are signals indicative of the leading edges of the pulses applied to the input terminal 10 of the transition detector.

The trailing edge markers from the latch 48 are applied on a line 62 to reset the negative peak circuit 16. When the negative peak circuit 16 is reset, it may then track and hold, or store, the next negative peak of the incoming signal. The output of the latch 49 is applied through a line 63 to reset the positive peak circuit 15 to allow this circuit to track and hold the next positive peak of the incoming signal.

A description of the operation of the transition detector in FIG. 1 will follow a discussion of the signals illustrated in FIGS. 2 through 4. FIG. 2a shows a PAM–NRZ signal 70 having no low frequency disturbance or noise. FIG. 2b illustrates the same signal contaminated by low frequency disturbance illustrated by the dashed line 71. A dashed line 72 in FIG. 2a illustrates a fixed slicing level commonly employed in prior art systems. As can be seen from FIG. 2a, only the leading edge 73 of the first pulse and the trailing edge 74 of the last pulse are detected when utilizing a fixed slicing level. The remaining transitions, such as the leading edge 75 of the second pulse, will not be detected. Note in FIG. 2b that in the presence of low frequency disturbance 71 the trailing edge 74 of the last pulse is not accurately indicated when employing the fixed slicing level. In this case, the trailing edge 74 is indicated as occurring at a point 76 which, of course, is an erroneous indication. According to the present invention, the negative and positive peaks of the pulses are continuously detected and the value thereof held or stored, then a predetermined slicing level or threshold is based on this stored value. In other words, the slicing level or threshold is not one fixed value for all pulses, but is dependent upon the last negative or positive peak value when detecting PAM–NRZ signals. Thus, the value of the signal at a point 77 is detected and the slicing level set at a fixed magnitude above that point at a point 78. When the signal rises to the point 78, a leading edge marker is provided on the output line 61 from the latch 49 in FIG. 1. Also at this time, both the positive and negative peak circuits 15 and 16, respectively, are reset in preparation for storing the next peak value of the signal. Thus, leading and trailing edge markers are provided when the signal traverses points 78, 79, 80, 81, 82 and 83. When dealing with PAM–NRZ signals it is not known whether succeeding pulses will be positive or negative and, therefore, both leading and trailing edge markers are provided for each signal transition as will be explained in greater detail subsequently.

FIG. 3a illustrates a PAM–RZ signal, and FIG. 3b illustrates the same signal contaminated by low frequency disturbance and noise. A fixed slicing level is indicated by the reference numeral 87 in FIGS. 3a and 3b. With the uncontaminated signal in FIG. 3a the signal transitions are accurately detected by utilizing a fixed slicing level, except for the errors introduced because of the slope of the signal pulses caused by filtering. When the signal is contaminated by low frequency disturbance appreciable errors occur when using a fixed slicing level. The dashed line 88 in FIG. 3b indicates such a low frequency disturbance. In this case, only the leading edge 89 of the first pulse and the trailing edge 90 of the last pulse are detected when using a fixed slicing level 87. When utilizing the concepts of the present invention, the leading and trailing edges of all pulses are accurately detected because the slicing level or threshold is changed for each pulse. The resulting thresholds and leading and trailing edge markers occur at points 91 through 102. That is, a leading edge marker occurs at point 91, a trailing edge marker occurs at point 92, a leading edge marker occurs at point 93, etc. Thus it can be seen from FIG. 3b, that the leading and trailing edges are accurately indicated even in the presence of low frequency disturbance.

FIG. 4a indicates a PDM signal, and FIG. 4b indicates the same signal contaminated with low frequency disturbance and noise. Since the magnitude of PDM signals is fixed, it has been conventional to establish a 50% fixed slicing level for such signals, i.e., detect the leading and trailing edges of the pulses when they traverse 50% of their maximum positive or negative excursions. The fixed slicing level is indicated by the reference numeral 106, and such a level provides accurate detection with the uncontaminated signal shown in FIG. 4a. However, errors occur when a PDM signal is contaminated with low frequency disturbance 107 as indicated in FIG. 4b. Here it can be seen that certain transistions are not detected during the peak of the low frequency disturbance. According to the concepts of the present invention, a variable 50% slicing level or threshold is utilized. This threshold is not based on a fixed reference, but depends only on the peaks of the preceding pulse. These thresholds are indicated by points 108 through 119. Hence, all signal transitions are indicated even in the presence of low frequency disturbance and noise.

Although it has not been discussed specifically in connection with FIGS. 2 through 4, errors frequently also are introduced when utilizing a fixed slicing level where the signals are additionally contaminated by high frequency noise, or have been degraded by excessive filtering.

Referring again to FIG. 1, the operation of the transition detector will be described in connection with PDM, PAM–RZ and PAM–NRZ input signals. Considering first a PDM input signal such as that illustrated in FIG. 4b, the signal is applied to the input terminal 10 and through the input amplifier 11 to the terminal 12. Since transitions of PDM signals are being detected, the function switches A and B are switched to their third positions. The transition detector illustrated in FIG. 1 is designed to selectively operate in different frequency ranges, such as, a low range and a high range. Signals applied to input lines 130 through 134 of the signal filter 14, the positive peak circuit 15, the negative peak circuit 16, the latch 48 and the latch 49, respectively, switch these particular circuits to the desired frequency range.

In addition to operating the function switches A and B depending upon the type of signal being detected the threshold control circuit 18 includes two input lines 136 and 137 to select the desired function, i.e., to operate the threshold control circuit 18 in connection with the function switches 28 and 33 to provide the proper threshold levels for the particular type of input signals which are being detected. The range and function control signals and the manner in which they affect circuit operation will be described in greater detail in connection with a discussion of FIGS. 5 through 9. It should suffice at this point to note that the threshold control circuit 18 passes PDM signals without alteration, and adds or subtracts a fixed potential to PAM signals.

The signal $e_s$ is filtered by the signal filter 14, and then is applied to the threshold control circuit 18. The following Table I indicates the threshold levels established at the output of the threshold control circuit 18 for PDM and PAM input signals. Certain potentials are applied to the function inputs 136 and 137 to provide particular currents within the threshold control circuit 18 which in turn adds or subtracts potentials from the signal applied to the input of the threshold control circuit 18.

TABLE I.—THRESHOLD LEVELS

|  | PDM | PAM RZ | PAM NRZ |
|---|---|---|---|
| $e_b =$ (Line 19) | $e_s$ | $e_s$ | $e_s - 0.2$ |
| $e_d =$ (Line 20) | $e_s$ | $e_s - 0.2$ | $e_s + 0.2$ |

Thus, for PDM signals (which are presently being considered) no potential is added to the singal $e_s$ and it passes through the threshold control circuit 18 without alteration. In the case of PAM signals, potentials are added to or subtracted from the signal $e_s$ as indicated in Table I. Although a particular potential is indicated as being added to or subtracted from the signal $e_s$ when dealing with PAM signals, other values may be added or subtracted, if desired. It now should be apparent that the threshold control circuit 18 provides signals $e_b$ and $e_d$ (which are both equal to $e_s$ in certain instances) on the respective lines 19 and 20 to the comparators 22 and 23, respectively.

As noted previously, the signal $e_s$ also is applied from the terminal 12 to both the positive and negative peak circuits 15 and 16. The positive peak circuit 15 detects and stores the positive peak of the signal $e_s$. Likewise, the negative peak circuit 16 detects and stores the negative peak of the signal $e_s$. Hence, the positive peak circuit 15 provides an output signal $e_{pp}$ equal to the last positive peak detected, and the negative peak circuit 16 provides an output signal $e_{np}$ equal to the last negative peak detected. These signals are applied to the respective amplifiers 26 and 31. The amplifier 26 substracts a fixed potential from the signal $e_{pp}$. This fixed potential, for example, may be 0.6 volt and constitutes a portion of the threshold level in certain instances. The resulting output, $e_{pp} - 0.6$ volt, is applied to the function switch 28.

In a similar manner the amplifier 31 adds 0.6 volt to the signal $e_{np}$ to provide a portion of the threshold level. The output, $e_{np} + 0.6$ volt, of the amplifier 31 is applied to the function switch 33. The signals from the amplifiers 26 and 31 are applied through the respective resistances 36 and 40 to the third contacts of the function switches 28 and 33, respectively. The resistances 36 and 40 are equal in value and have no noticable effect on the amplifiers 26 and 31. Hence, in dealing with PDM signals the respective outputs $e_a$ and $e_c$ of the function switches 28 and 33 are equal and are each $\frac{1}{2}(e_{pp}+e_{np})$. The outputs of the function switches 28 and 33 for each mode of operation are indicated in Table II below.

TABLE II.—FUNCTION SWITCH A (28)

| Position | PDM | PAM RZ | PAM NRZ |
|---|---|---|---|
|  | 3 | 2 | 1 |
| $e_a=$ | $\frac{1}{2}(e_{pp}+e_{np})$ | $\frac{1}{2}(e_{pp}+e_{np})$ | $e_{pp}-0.6$ |

FUNCTION SWITCH B (33)

| $e_c=$ | $\frac{1}{2}(e_{pp}+e_{np})$ | $e_{np}+0.6$ | $e_{np}+0.6$ |
|---|---|---|---|

The signals $e_a$ and $e_c$ are applied to the respective comparators 22 and 23. The output, $e_{01}$, of the comparator 22 is equal to $e_b-e_a$. The output, $e_{02}$, of the comparator 23 is equal to $e_d-e_c$. The outputs of the comparators 22 and 23 for the different modes of operation are indicated in Table III below.

TABLE III.—COMPARATOR A (22)

$[e_{01}=e_b-e_a]$

|  | PDM | PAM RZ | PAM NRZ |
|---|---|---|---|
| $e_{01}=$ | $e_s-\frac{1}{2}(e_{pp}+e_{np})$ | $e_s-\frac{1}{2}(e_{pp}+e_{np})$ | $(e_s-0.2)$<br>$-(e_{pp}-0.6)$<br>$=e_s-(e_{pp}-0.4)$ |

COMPARATOR B (23)

$[e_{02}=e_d-e_c]$

| $e_{02}=$ | $e_s-\frac{1}{2}(e_{pp}+e_{np})$ | $(e_s-0.2)$<br>$-(e_{np}+0.6)$<br>$=e_s-(e_{np}+0.8)$ | $(e_s+0.2)$<br>$-(e_{np}+0.6)$<br>$=e_s-(e_{np}+0.4)$ |
|---|---|---|---|

In considering the operation of the transition detector in FIG. 1, PDM signals, such as those illustrated in FIG. 4b, are applied to the input terminal 10. The negative peak of a pulse is read and held by the negative peak circuit 16. The point 120 in FIG. 4b indicates approximately the value stored in the negative peak circuit 16. As will be explained in greater detail subsequently, both the positive and negative peak circuits 15 and 16 include capacitors which function to store the values of the positive and negative peaks of the incoming signal.

Assuming a previous pulse in the signal train illustrated in FIG. 4b already has been received by the transition detector in FIG. 1, the positive peak circuit 15 has the last positive peak stored therein. Hence, the amplifier 26 applies a signal $e_{pp}-0.6$ volt to the function switch 28 and the amplifier 31 supplies a signal $e_{np}+0.6$ volt to the function switch 33. According to Table II above, the function switch 28 supplies a signal $e_a$ to the comparator 22, and this signal $e_a$ is equal to $\frac{1}{2}(e_{pp}+e_{np})$. In a similar manner the function switch 33 supplies a signal $e_c$ to the comparator 23, and this signal $e_c$ is equal to $\frac{1}{2}(e_{pp}+e_{np})$. As the signal $e_s$ which, for illustrative purposes, may be considered as a pulse 121 in FIG. 4b, rises in magnitude the outputs $e_b$ and $e_d$ of the threshold control circuit 18 also rise. When the signal $e_d$ becomes more positive than the signal $e_c$, the comparator 23 provides a positive-going output signal $e_{02}$ on the line 47. Thus, when the signal $e_s$ reaches the point 108 in FIG. 4b, the comparator 23 supplies an output which triggers the latch 49. The latch 49 in turn provides a leading edge marker on the output line 61. This leading edge marker is substantially a rectangular pulse, the duration of which is determined by the constants of the latch 49.

The leading edge marker from the latch 49 also is applied through the line 63 to reset the positive peak circuit 15. This operation allows the positive peak circuit 15 to store a new positive peak which is indicated by a point 122 on the pulse 121 in FIG. 4b. The negative peak circuit 16 still stores the value indicated by the point 120. As the pulse 121 again goes negative, the comparator 22 provides a negative-going output when the signal $e_b$ becomes smaller than the signal $e_a$. This output occurs approximately at the point 109 on the pulse 121 in FIG. 4b. The output $e_{01}$ of the comparator 22 is applied through the line 46 to set the latch 48 which in turn provides a trailing edge marker on the output line 60. The output of the latch 48 also is applied through the line 62 to reset the negative peak circuit 16. After the negative peak circuit 16 is reset, it then stores the new negative peak of the signal which is indicated by a point 123 in FIG. 4b. This operation continues with the positive and negative peak circuits 15 and 16 alternately being reset and storing the new positive and negative peaks, respectively. Thus, the leading and trailing edge markers are produced when the respective leading and trailing edges of the signal pulses reach approximately 50% of their maximum value as indicated by the remaining points 110 through 119 in FIG. 4b.

The transition detector illustrated in FIG. 1 operates in a similar manner with PAM signals. Basically, the only differences in operation between PAM and PDM signals are the particular threshold levels utilized. As has been discussed in connection with PDM signals, 50% thresholds are utilized for both the leading and trailing edges of the pulses. With PAM–RZ signals, a particular threshold level above the negative peak is utilized for the leading edge of pulse, and approximately a 50% threshold is utilized for the trailing edge of the pulse. In the case of PAM–NRZ signals, a particular threshold level above or below the negative or positive peak is utilized for both the leading and trailing edges of the pulses. The threshold levels are set by applying particular voltages to the function lines 136 and 137 of the threshold control circuit 18 and by the setting of the function switches 28 and 33 as was discussed previously. Thus, the circuits in the transition detector in FIG. 1 operate in substantially the same manner when PDM or PAM signals are received, but certain circuits are operated at different levels.

Considering PAM–RZ signals, such as those illustrated in FIG. 3b, the leading edge threshold indicated by the point 91 may be 0.8 volt above the previous negative peak, and the trailing edge threshold indicated by the numbers indicated mathematically in Table III. The output $e_{02}$ indicated mathematically in Tabel III. The output $e_{02}$ of the comparator 23 is equal to $e_s-(e_{np}+0.8)$. Since the latch circuit 49 is triggered only by a positive going signal, a leading edge marker is produced when the signal $e_s$ becomes larger than $e_{np}+0.8$ volt. Since the latch circuit 48 is triggered only by negative going signals, a trailing edge marker is produced whenever the signal $e_s$ becomes smaller than $\frac{1}{2}(e_{pp}+_{np})$ volt.

When operating with PAM–RZ signals, no potential is applied to the function line 136 (as in PDM operation) and a negative potential is applied to the function line 137 of the threshold control circuit 18. The potential on the line 137 causes the threshold control circuit 18 to provide the output signal $e_d$ which is equal to $e_s-0.2$ volt. The signal $e_b$ is equal to the signal $e_s$. The relationship between the signal $e_s$ and the output signals $e_b$ and $e_d$ is indicated in Table I above. Hence, the threshold control circuit 18 supplies the signal $e_s$ to the comparator 22, and $e_s-0.2$ volt to the comparator 23.

When PAM–RZ signals are applied to the transition detector, the positive and negative peak circuits 15 and 16 operate in the same manner as with PDM signals. Thus, the signals applied to the function switches 28 and 33 are the same in either mode of operation (PDM or PAM). When dealing with PAM–RZ signals, the function switches 28 and 33 are switched to their second position. Since the second and third contacts of the function switch 28 are connected by the line 37, the output signal $e_a$ of the function switch 28 is the same whether operating in the PDM or the PAM–RZ mode. Thus, in either case, the output signal $e_a$ is equal to $\frac{1}{2}(e_{pp}+e_{np})$ as shown in Table II above. However, the output signal $e_c$ of the function switch 33 is different since the contact arm 39 is connected directly with the output of the amplifier 31. Thus, the output signal $e_c$ of the function switch 33 is equal to $e_{np}+0.6$ volt (the 0.6 volt being added by the amplifier 31 as discussed previously) in the PAM–RZ mode of operation. The comparators, inhibit circuits and latch circuits operate in the same manner as when detecting transitions of PDM signals.

The inputs $e_c$ and $e_d$ to the comparator 23 cause an output $e_{02}$ which is equal to $e_s-(e_{np}+0.8)$ as indicated in Table III above. Thus, when the signal $e_s$ becomes larger than $e_{np}+0.8$ volt, the latch circuit 49 is triggered and in turn provides a leading edge marker. The leading edge markers occur at the points 91, 93, 95, 97, 99 and 101 in FIG. 3b. The input signals $e_a$ and $e_b$ to the comparator 22 cause an output signal $e_{01}$ equal to $e_s-\frac{1}{2}(e_{pp}+e_{np})$ as indicated in Table III. The comparator 22 provides a negative output to trigger the latch circuit 48 when the signal $e_s$ becomes more negative than $\frac{1}{2}(e_{pp}+e_{np})$ volt. In other words, the threshold level and consequently the point at which the trailing edge markers are produced for the trailing edges is approximately the 50% point. The points 92, 94, 96, 98, 100 and 102 in FIG. 3b indicate these trailing edge thresholds, or points at which trailing edge markers are produced.

The operation of the transition detector in FIG. 1 with PAM–NRZ signals is similar to the operation with PAM–RZ signals. However, there are a few differences in operation which are described below. A negative potential is applied to the function input 136 and a positive potential is applied to the function input 137 of the threshold control circuit 18. The output signal $e_b$ is equal to $e_s-0.2$ and the output signal $e_d$ is equal to $e_s+0.2$ volt. The function switches 28 and 33 are switched to the first position. The first and second positions of the function switch 33 are connected by the line 41, and the output signal $e_c$ of the switch 33 is the same as when using PAM–RZ signals. Since the contact arm 35 of the function switch 28 is connected to the first contact, the output signal $e_a$ from the function switch 28 is equal to the output $(e_{pp}-0.6)$ of the amplifier 26. The signals $e_b$ and $e_d$ from the threshold control circuit 18 and the signals $e_a$ and $e_c$ from the respective function switches 28 and 33 are set forth respectively in Tables I and II above. The comparator inputs and outputs are set forth in Table III above. Table III indicates that the comparator 23 provides a positive-going signal to trigger the latch circuit 49 when the signal $e_s$ exceeds $e_{np}+0.4$ volt. The comparator 22 provides a negative-going output to trigger the latch 48 when the signal $e_s$ falls below $e_{pp}-0.4$ volt. It should be noted that when dealing with PAM–NRZ signals it is not known whether a succeeding pulse (leading edge or trailing edge) will be positive-going or negative-going. Thus, in order to insure the storage of succeeding positive and negative peaks, leading and trailing edge markers are produced for each signal transition above the particular thershold to reset the positive and negative peak circuits 15 and 16.

In order to trigger both latch circuits 48 and 49 upon the occurrence of a leading or trailing edge, the inhibit circuits 51 and 53 are not inhibited. When the inhibit circuit 51 is not inhibited, the complement of the signal $e_{01}$ is applied through the line 57 to the latch 49. Likewise, the complement of the signal $e_{02}$ is applied through the line 58 to the latch 48 when the inhibit circuit 53 is not inhibited. Hence, when the comparator 23 provides a positive-going output signal $e_{02}$ on the line 47 to trigger the latch circuit 49, a negative-going signal also is supplied on the line 58 to trigger the latch circuit 48. When the comparator 22 provides a negative-going output signal on the line 46 to trigger the latch circuit 48, a positive-going signal is likewise provided on the line 57 to trigger the latch circuit 49. Hence, leading and trailing edge markers are produced by the transition detector in FIG. 1 at points 78 through 83 in FIG. 2b. When leading and trailing edge markers are produced by the latch circuits 49 and 48, the respective positive and negative peak circuits 15 and 16 are reset in the same manner discussed previously in order to allow these circuits to read and hold new positive and negative peaks.

As was noted previously, the amplifiers 26 and 31 subtract from and add to the respective $e_{pp}$ and $e_{np}$ signals to provide a portion of the threshold level. As will become apparent subsequently, this is done because it is convenient to utilize the offset voltage of a transistor in each of the amplifiers 26 and 31. However, all threshold control may be provided by the threshold control circuit 18. That is, the necessary potentials to provide the desired threshold levels may be subtracted from and added to the signal $e_s$ by the threshold control circuit 18. Additionally, other magnitudes of voltage may be subtracted from or added to the signal $e_s$ by the threshold control circuit 18 merely by applying a particular potential or potentials to the function input lines 136 and 137.

As will become apparent in a description of FIGS. 5 through 9, the function switches 28 and 33 preferably are electronic switches. Such switches provide more flexible and faster operation. Values different from those previously discussed may be desired for the switch output signals $e_a$ and $e_c$ in order to provide different threshold levels. For example, when detecting transitions of PAM–RZ signals it may be desirable to utilize a threshold level for the trailing edge at a particular value below the positive peak instead of the 50% level previously discussed. In this case, the first and second contacts of the function switch 28 may be connected together instead of the second and third contacts thereby providing an output signal $e_a$ equal to the output $(e_{pp}-0.6)$ of the amplifier 26.

Additionally, a fixed potential input may be provided to either or both function switches 28 and 33 (by means of a fourth contact, or the like) to provide a fixed slicing level (as generally utilized in the prior art) in those cases where the character of the signals being detected will allow the use of a fixed slicing level without introducing appreciable errors. Thus, it should be apparent that the transition detector illustrated in FIG. 1 offers complete flexibility in the selection of threshold levels and accurate detection of signal transitions of different types of signals.

Exemplary circuit diagrams for the components illustrated in block diagram form in FIG. 1 are shown in FIGS. 5 through 9. When FIGS. 5 through 9 are arranged as illustrated in FIG. 10, they provide an interconnected circuit diagram of the transition detector shown in block form in FIG. 1. Like reference numerals are utilized for designating the components in FIGS. 5 through 9 which are the same as shown in FIG. 1.

Figure 5:
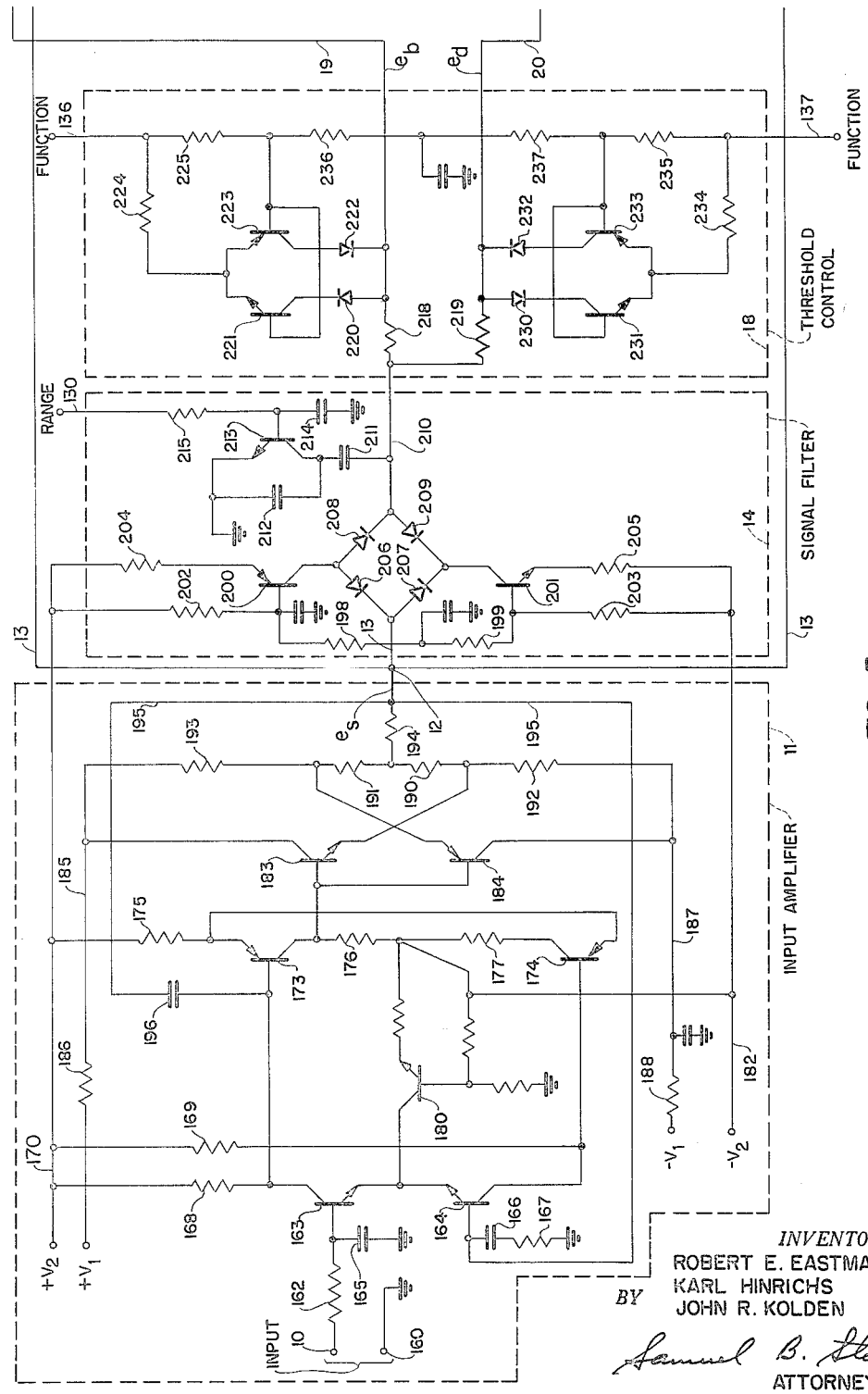

An input signal is applied to the input terminal 10 of the input amplifier 11 shown in FIG. 5. This signal is applied between the input terminal 10 and a ground terminal 160. The input terminal 10 is connected through a resistance 162 to the base of a transistor 163. The emitter of the transistor 163 is connected to the emitter of a transistor 164, and these two transistors function as a differential amplifier. The base of the transistor 163 is connected through a capacitance 165 to ground, and the base of the transistor 164 is connected through a capacitance 166 and a resistance 167 to ground. The collectors of the transistors 163 and 164 are connected through respective resistances 168 and 169 to a positive voltage line 170. The positive voltage line 170 is connected to a voltage source (not shown) which may be, for example, plus eighteen volts.

The collectors of the transistors 163 and 164 are connected to the bases of respective transistors 173 and 174 which function as a differential amplifier. The emitters of the transistors 173 and 174 are connected through a resistance 175 to the positive voltage line 170. The collectors of the transistors 173 and 174 are interconnected through resistances 176 and 177. A transistor 180 which serves as a current source is connected between the emitters of the transistors 163 and 164 and the resistances 176 and 177. The junction of the resistors 176 and 177 also is connected to a negative potential line 182 which is connected to a source of negative voltage (not shown). The source of voltage connected to the line 182 may be, for example, minus eighteen volts.

The collector of the transistor 173 is connected to the bases of transistors 183 and 184 which are connected as complementary emitter followers. The collector of the transistor 183 is connected to a positive potential line 185. The line 185 is connected through a resistance 186 to a source of positive potential (not shown) which may be twelve volts. In a similar manner, the collector of the transistor 184 is connected to a negative potential line 187 which in turn is connected through a resistance 188 to a negative voltage source (not shown). The emitters of the transistors 183 and 184 are connected across resistances 190 and 191, and through respective resistances 192 and 193 to the negative and positive potential lines 187 and 185, respectively. The junction of the resistances 190 and 191 is connected through a resistance 194 to the output terminal 12 of the input amplifier 11. A feedback line 195 is connected from the terminal 12 to the base of the transistor 164, and through a capacitance 196 to the base of the transistor 173. As discussed previously, the input amplifier 11 is a unity gain amplifier and serves to isolate the source of data signals from the remainder of the components in the transition detector.

The output of the input amplifier 11 is connected through the line 13 to the signal filter 14 which functions to take out high frequency spikes, and similar disturbances which may be introduced by the operation of the positive and negative peak read and hold circuits as discussed previously. Resistances 198 and 199 are connected to the bases of respective transistors 200 and 201 which serve as current sources. The bases of the transistors 200 and 201 are connected through respective resistances 202 and 203 to the positive and negative potential lines 170 and 182, respectively. The emitters of the transistors 200 and 201 are connected to the potential sources in a similar manner through respective resistances 204 and 205. The collectors of the transistors 200 and 201 are connected to a diode bridge including diodes 206 through 209. The line 13 from the amplifier 11 is connected to the junction of the diodes 206 and 207.

The junction of the diodes 208 and 209 is connected to a line 210. Capacitances 211 and 212 are connected from the line 210 to ground. A transistor 213 which functions as a range control switch is connected across the capacitor 212. This range control switch increases or decreases the capacitance to be charged and thereby changes the frequency range of the signal filter. The base of the transistor 213 is connected through a capacitance 214 to ground, and through a resistance 215 to the range control line 130. The transistor 213 is turned on or off to control the frequency range of signals passed by the signal filter 14. The transistor 213 may be turned on by applying a positive potential V1 to the range control line 130. When the transistor 213 is turned on, the capacitor 212 connected across the transistor 213 is short-circuited and a low range of signals (for example, 50 to 500 cycles) may be passed by the signal filter. The transistor 213 may be turned off by applying a negative potential V1 to the range control line 130. In this case, the capacitor 212 is not shorted by the transistor 213 and a high range of signals (for example, 500 to 5,000 cycles) may be passed by the signal filter 14.

Current flows from the positive potential line 170 through the resistance 204, the transistor 200, the diodes 206 through 209, the transistor 201, the resistance 205 and the negative potential line back to the voltage source. Normally this current divides between the legs of the bridge, that is, current exists through the diodes 206 and 207 and through the diodes 208 and 209. When a pulse appears at the point 12, it is applied through the line 13 to back-bias one of the diodes 206 or 207. Assuming, for example, that a positive-going pulse is present on the line 13, the diodes 206 and 209 become back-biased. The current through the transistor 200 then passes through the diode 208 to charge the capacitor 212. When the capacitor 212 becomes charged to a value corresponding to the value of the signal on the line 13, the diodes 206 and 209 are no longer back-biased and the current divides through the diode bridge in a normal manner. The signal appearing on the line 210 is a filtered signal, and by utilizing a current source for charging one or more capacitors an output pulse having a linear slope is obtained.

The filtered signal on the line 210 is applied to the threshold control circuit 18 which functions to pass the input signal unaltered, or to add voltages to or subtract voltages from the filtered signal to provide the output signals $e_b$ and $e_d$ on the respective output lines 19 and 20. The line 210 is connected through a resistance 218 to the line 19, and through a resistance 219 to the line 20. The line 19 is connected through a diode 220 to the collector of a transistor 221, and through a diode 222 to the collector of a transistor 223. The emitters of the transistors 221 and 223 are connected together and connected through a resistance 224 to the function input line 136. The bases of the transistors 221 and 223 are connected together and connected through a resistance 225 to the function line 136. The line 20 is connected through a diode 230 to the collector of a transistor 231, and through a diode 232 to the collector of a transistor 233. The emitters of transistors 231 and 233 are connected together and connected through a resistance 234 to the function input line 137. The bases of the transistors 231 and 233 are interconnected and connected through a resistance 235 to the function line 137. The bases of the transistors 221 and 223 and the bases of the transistors 231 and 233 are interconnected through resistances 236 and 237.

When a zero potential difference is applied to the function input lines 136 and 137, the transistors 221, 223, 231 and 233 are turned off and the filtered signal on the line 210 passes to the lines 19 and 20 without alteration. When particular potentials are applied to the function input lines 136 and 137, certain of the transistors 221, 223, 231 and 233 are turned on and operate as current sources. When one or more of the transistors operates as a current source, a current is supplied through one or both of the resistances 218 and 219 to provide a potential which adds to or subtracts from the input signal. For example, in the PAM-RZ mode, zero volts is applied to the function input line 136 and a negative potential V2 is applied to the function input line 137. The signal $e_b$ on the line 19 then is the same as that supplied by the line 210. The transistor 231 is turned on and draws a current through the resistance 219 and the diode 230. The current through the resistance 219 causes a potential drop which substracts from the signal on the line 210. In the PAM-NRZ mode of operation, a negative potential is applied to the line 136 and a positive potential is applied to the line 137. In the PDM mode, zero volts is applied to both lines 136 and 137. It should be apparent that the theshold control circuit offers flexible operation by merely supplying particular control potentials thereto. Additionally, different components, circuit constants or control voltages may be utilized to provide any desired threshold levels with or without external control.

Figure 6:
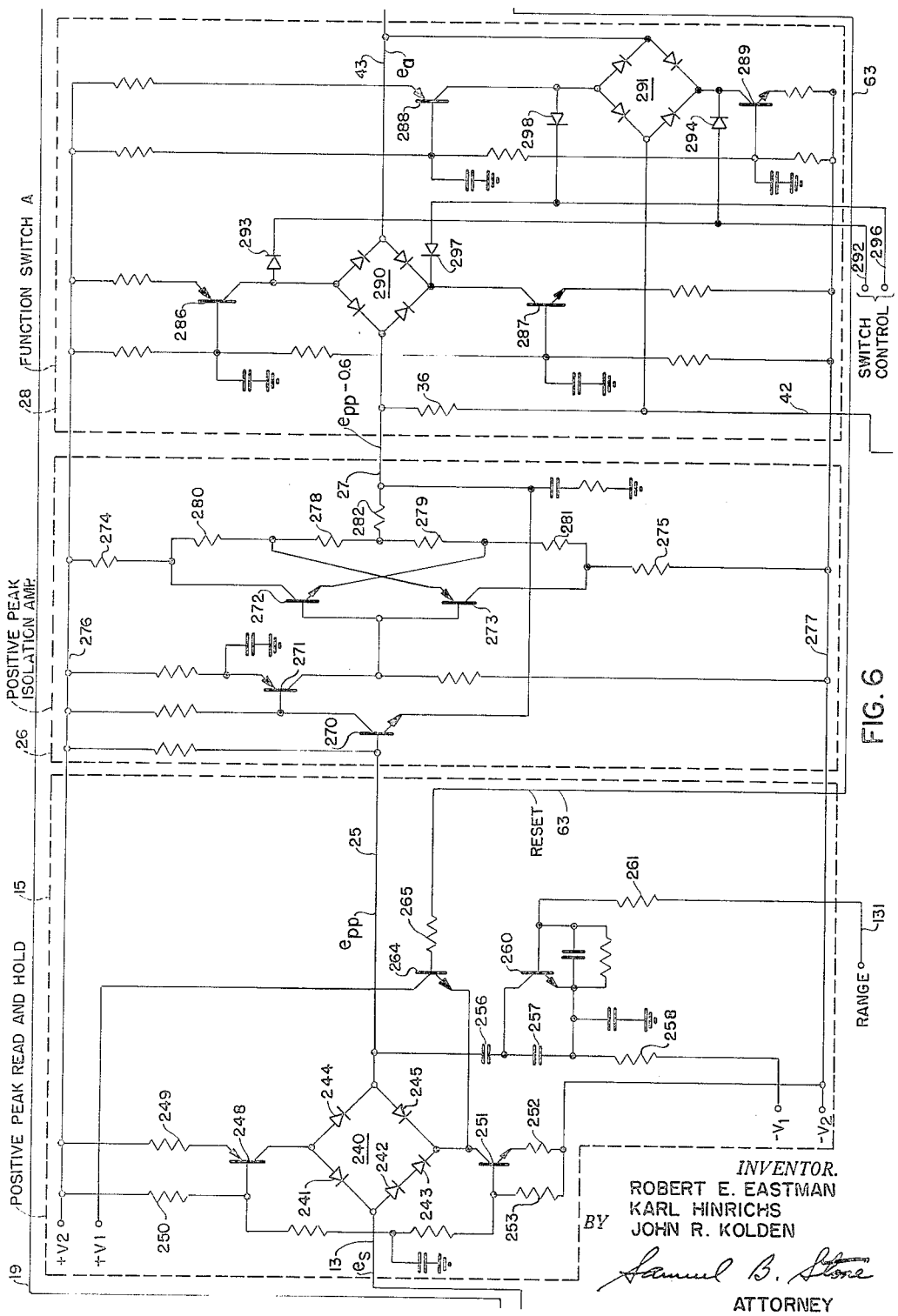

Turning now to the positive peak read and hold circuit 15 illustrated in FIG. 6, the signal line 13 from the input amplifier 11 in FIG. 5 is connected to a diode bridge 240. The diode bridge 240 includes diodes 241 through 245, and the line 13 is connected to the junction of the diodes 241 and 242. A transistor 248 which serves as a current source is connected to the bridge 240 and through a resistance 249 to the positive voltage source V2. The base of the transistor 248 is connected through a resistance 250 to the positive voltage V2. In a similar manner, a transistor 251 which serves as a current source is connected to the bridge circuit 240 and through a resistance 252 to the negative voltage source V2. A resistance 253 is connected between the base of the transistor 251 and the negative potential source V2. The junction of the diodes 244 and 245 is connected to the output line 25, and through a capacitance 256, a capacitance 257 and a resistance 258 to the negative voltage V1.

A range switching transistor 260 is connected across the capacitance 257. The range control line 131 is connected through a resistance 261 to the base of the transistor 260. A zero potential turns on the transistor 260 which in turn short-circuits the capacitor 257 for low range (for example, 50 to 500 cycles) operation. A negative potential (—V2) is applied to the range control line 131 to turn off the transistor 260 for high range (for example, 500 to 5,000 cycles) operation. The emitter of an emitter-follower 264 is connected to the collector of the transistor 251. The reset line 63 which is connected from the output of the latch circuit 49 (FIG. 10) as discussed in describing FIG. 1 is connected through a resistance 265 to the base of the emitter-follower 264. The collector of the emitter-follower 264 is connected to the source of positive potential V1. As noted previously, the positive peak read and hold circuit 15 functions to follow (track) the positive peaks of the input signal $e_s$ and hold, or store, these peak values. The capacitor 256 (or both the capacitor 256 and the capacitor 257 if in the high-range mode of operation) stores the peak values of the signal $e_s$.

In the operation of the positive peak and read hold circuit 15 in FIG. 6, the transistor 264 is normally on and applies a positive potential V1 to the junction of the diodes 243 and 245 to back-bias these diodes. Thus, any current from the positive potential source V2 flows through the transistor 248 and the diode 241 or the diode 244. When a positive-going signal is present on the line 13, the diode 241 becomes back-biased and current flows through the transistor 248 and the diode 244 to charge the capacitor 256. The capacitor 256 charges until the voltage at the junction between the diodes 244 and 245 becomes equal to the positive peak voltage at the junction of the diodes 241 and 242. Hence, the capacitor 256 charges to the positive peak value of the signal on the line 13 and holds this charge until a reset signal is applied through the line 63 and the resistance 265 to the base of the transistor 264. The positive peak is held when the capacitor 256 becomes charged because the diode 244 becomes back-biased by the charge on the capacitor 256 when the signal on the line 13 goes slightly negative, and any current from the current source transistor 248 flows through the diode 241 to the line 13. Thus, the positive peak of the input signal is read and held by the capacitor 256, and this value, which is termed the signal $e_{pp}$, is supplied on the line 25 to the positive peak isolation amplifier 26 to be discussed subsequently.

When a reset signal is applied to the base of the transistor 264, this transistor turns off. When the transistor 264 turns off, the diodes 243 and 245 are no longer back-biased and the capacitor 256 discharges through the path including the diode 245, the transistor 251, the resistance 252 and the negative potential source V2. Also at this time, current flows through the transistor 248, the bridge 240 and the transistor 251 rather than flowing into the capacitor 256. The diode 242 is included to cause the positive peak read and hold circuit to track slightly negative on the reset portion of the cycle, i.e., the charge on the capacitor is slightly more negative than the value of the signal on the line 13. However, when the signal on the line 13 goes positive as discussed previously the capacitor 256 charges to a value equal to the positive peak. If desired, an external control voltage may be applied to the bases of the transistors 248 and 251 to control the time of charging of the capacitor 256. This charging time may be increased to reduce the effects of noise peaks present on the input signal.

The signal $e_{pp}$ is applied through the line 25 to the base of a transistor 270 in the positive peak isolation amplifier 26. The collector of the transistor 270 is connected to the base of a transistor 271. The collector of the transistor 271 is connected to the bases of transistors 272 and 273 which are connected as complementary emitter-followers. The collectors of the transistors 272 and 273 are connected through respective resistances 274 and 275 to positive and negative potential lines 276 and 277, respectively. The emitters of the transistors 272 and 273 are connected across resistances 278 and 279. A resistance 280 is connected between the resistance 278 and the resistance 274, and a resistance 281 is connected between the resistance 279 and the resistance 275. The junction of the resistances 278 and 279 is connected to a resistance 282, which in turn is connected to the output line 27 of the positive peak isolation amplifier 26. The output line 27 is connected to the emitter of the transistor 270 providing a feedback path to make the gain of the amplifier unity. The output line 27 also is connected to ground through a capacitor 283 and a resistance 284. The capacitor 283 and resistor 284 function as a roll-off network and provide stability. The positive peak isolation amplifier 26 functions to isolate the positive peak read and hold circuit 15 from the function switch 28, and the potential drop across the base-emitter of the transistor 270 is subtracted from the input signal $e_{pp}$ to provide part of the threshold level. In the example previously given in connection with a discussion of FIG. 1, this potential drop may be 0.6 volt whereby the positive peak isolation amplifier 26 provides an output signal $e_{pp}$—0.6 volt on the output line 27. It is not necessary to utilize an amplifier which provides such a potential drop. Furthermore, an amplifier having a gain greater than one may be used, if desired.

The output of the positive peak isolation amplifier 26 is applied through the output line 27 to the function switch 28 in FIG. 6. The function switch 28 includes transistors 286 through 289 which function as current sources. A diode bridge 290 is connected between the transistors 286 and 287, and a diode bridge 291 is connected between the transistors 288 and 289. A switch control line 292 is connected through a diode 293 to the junction of the collector of the transistor 286 and the upper terminal of the diode bridge 290. In a similar manner, the switch control line 292 is connected through a diode 294 to the junction of the collector of the transistor 289 and the lower terminal of the diode bridge 291. A switch control line 296 is connected through a diode 297 to the junction of the lower terminal of the bridge 290 and the collector of the transistor 287. Likewise, the line 296 is connected through a diode 298 to the junction of the collector of the transistor 288 and the upper terminal of the bridge 291. The line 27 from the positive peak isolation amplifier 26 is connected to the left-hand terminal of the bridge 290 and through the resistance 36 to the left-hand terminal of the bridge 291. The right-hand terminals of the bridges 290 and 291 are connected to the output line 43 of the function switch 28.

Although a mechanical function switch 28 is illustrated in FIG. 1 for simplicity of illustration, it is preferable to employ an electronic function switch of the nature of that illustrated in FIG. 6. The electronic function switch 28 in FIG. 6 provides faster operation and greater flexibility of operation. Table IV below indicates the switch control potentials applied to the lines 292 and 296 and the resulting output signal $e_a$ on the line 43 for the different modes of operation.

TABLE IV

|  | PDM | PAM RZ | PAM NRZ |
|---|---|---|---|
| Control V: | | | |
| Line 292 | −V1 | −V1 | +V1 |
| Line 296 | +V1 | +V1 | −V1 |
| $e_a=$ | ½($e_{pp}+e_{np}$) | ½($e_{pp}+e_{np}$) | $e_{pp}-0.6$ |

In the PDM and the PAM–RZ modes of operation, the diode bridge 290 is biased off and the diode bridge 291 is biased on. That is, the diode bridge 290 does not supply an output on the line 43 which is a replica of the input on the line 27 and the bridge 291 does provide an output on the line 43 which is a replica of the input thereto. A negative voltage (−VI) is applied to the switch control line 292 and a positive voltage (+V1) is applied to the switch control line 296. The negative voltage on the line 292 forward biases the diode 293, and the positive voltage on the line 296 forward biases the diode 297. Hence, a negative voltage is applied to the upper terminal of the diode bridge 290, and a positive voltage is applied to the lower terminal of the bridge 290. Thus, current from the current source transistor 286 flows through the diode 293 rather than the bridge 290, and current flows through the diode 297 and the current source transistor 287. The voltage swing on the input line 27 is smaller than the potential supplied to the upper and lower terminals of the bridge and, therefore, does not affect the biasing of the diodes in the bridge 290 since these diodes are back biased and present a high impedance.

The negative voltage on the line 292 back biases the diode 294, and the positive voltage on the line 296 back biases the diode 298. The diodes in the bridge 291 are forward biased and present a low impedance to input signals. In this case, current normally flows through the transistor 288, divides through the diodes in the bridge 291 and flows through the transistor 289 back to the voltage source V2. When a signal is applied to the left-hand terminal of the diode bridge 291, the division of current through the legs of the bridge is altered thereby causing the potential on the right-hand terminal of the bridge to be a replica of that applied to the left-hand terminal. The resistances 36 and 40 (FIG. 8) interconnecting the outputs of the positive peak isolation amplifier 26 and the negative peak isolation amplifier 31 (FIG. 8) supply the signal ½($e_{pp}+e_{np}$) to the left-hand terminal of the diode bridge 291. Hence, this same signal is applied from the right-hand terminal of the diode bridge 291 to the output line 43.

The inverse of the voltages discussed above is applied to the switch control lines 292 and 296 to turn on the diode bridge 290 and turn off the diode bridge 291. The voltages utilized are illustrated in Table IV above. When the diode bridge 290 is turned on, the signal $e_{pp}-0.6$ volt is applied to the output line 43. This output signal on the line 43 is termed $e_a$ as in the description of FIG. 1.

Figure 7:
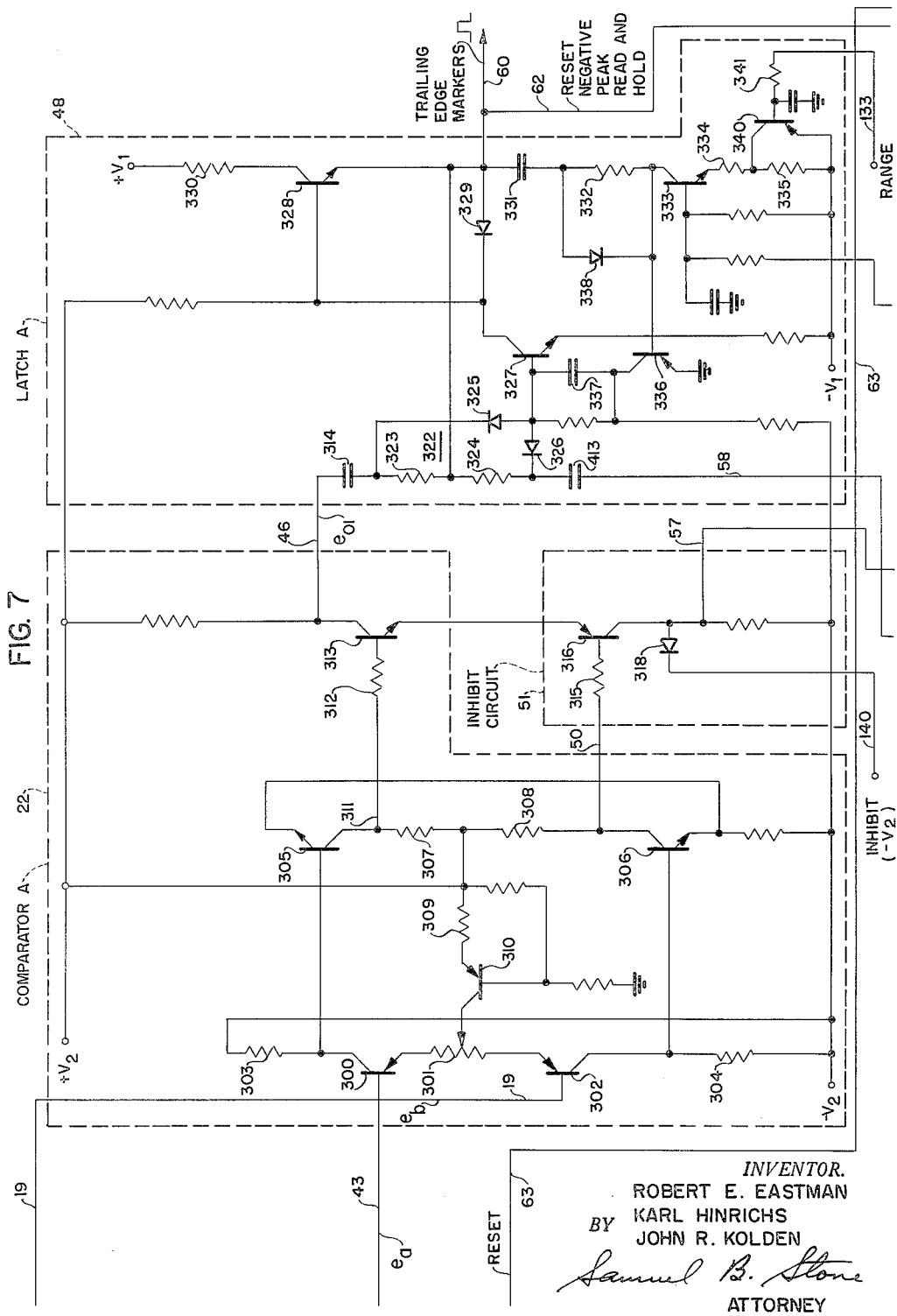

The signal $e_a$ from the function switch 28 is applied through the line 43 to the base of a transistor 300 in the comparator 22 in FIG. 7. The emitter of the transistor 300 is connected through a potentiometer 301 to the emitter of a transistor 302. The collectors of the transistors 300 and 302 are connected through respective resistances 303 and 304 to the negative potential source V2. The collectors of the transistors 300 and 302 are connected to the respective bases of transistors 305 and 306. The emitters of the transistors 305 and 306 are connected together and through a resistance to the source −V2. The collectors of the transistors 305 and 306 are connected together through resistances 307 and 308. The junction of the resistances 307 and 308 is connected to the voltage source +V2. The voltage source +V2 is connected through a resistance 309 to a transistor 310 which functions as a current source. The collector of the transistor 310 is connected to a variable tap on the potentiometer 301. The collector of the transistor 305 is connected through a line 311 and a resistance 312 to the base of a transistor 313. The collector of the transistor 313 is connected to the output line 46 of the comparator 22. The collector of the transistor 306 is connected through the line 50 and a resistance 315 to the base of a transistor 316 in the inhibit circuit 51.

The signal $e_a$ from the function switch 28 in FIG. 6 is applied through the line 43 to the base of the transistor 300, and the signal $e_b$ is applied through the line 19 from the threshold control circuit in FIG. 5 to the base of the transistor 302. The transistors 300 and 302 function as a differential amplifier, and the transistors 305 and 306 also function as a differential amplifier. The utilization of the current source transistor 310 aids in the rejection of common mode voltages. The comparator 22 functions to compare the two input signals $e_a$ and $e_b$, and to provide an output signal $e_{01}$ on the line 46 corresponding to the difference in these input signals. The complement of the output signal on the line 311 is provided on the line 50 to the inhibit circuit 51.

The emitters of the transistors 313 and 316 are connected together. The inhibit line 140 is connected through a diode 318 to the collector of the transistor 316. The collector of the transistor 316 is connected through the output line 57 of the inhibit circuit 51 to the latch 49 in FIG. 9. The transistors 313 and 316 function as a differential amplifier when a positive voltage V2 is applied to the inhibit line 140. When an inhibit signal (−V2) is applied to the inhibit line 140, the transistor 316 acts as an emitter follower and the input signal to the inhibit circuit 51 on the line 50 is not transferred to the output line 57. The output signals on lines 46 and 57 are complementary signals.

The output signal $e_{01}$ of the comparator 22 on the line 46 is applied to the latch 48. The line 46 is connected through a capacitor 314 to an Or circuit 322 which includes resistances 323 and 324, and diodes 325 and 326.

The junction of the diodes 325 and 326 is connected to the base of a transistor 327. The Or circuit 322 functions to apply the signal from the comparator 22 on the line 46 to the base of the transistor 327, or to apply the signal from the inhibit circuit 53 in FIG. 9 on the line 58 to the base of the transistor 327. The collector of the transistor 327 is connected to the base of a transistor 328. The positive potential source V1 is connected through a resistance 330 to the collector of the transistor 328, and the emitter of the transistor 328 is connected through a capacitance 331, a resistance 332, a transistor 333 and resistances 334 and 335 to the negative potential source V1. The collector of the transistor 327 is connected through a diode 329 to the junction of the emitter of the transistor 328 and the capacitor 331. The collector of the transistor 333 is connected to the base of a transistor 336, the collector of which is connected through a capacitor 337 to the base of the transistor 327. A diode 338 is connected from the junction of the capacitor 331 and the resistance 332 to the base of the transistor 336. The collector and emitter of a range control transistor 340 are connected across the resistance 335. The range control line 133 is connected through a resistance 341 to the base of the transistor 340. The output line 60 of the latch circuit 48 is connected to the junction of the emitter of the transistor 328 and the capacitor 331. A latch of this nature is described in copending U.S. Patent application, Serial No. 195,812, entitled "One-Shot Latch," filed concurrently herewith, and assigned to the assignee of the present invention.

The transistors 327, 328, 336 and 340 of the latch circuit 48 function as switches, and the transistor 333 functions as a current source. The latch circuit 48 responds only to negative-going signals from the comparator 22 to provide trailing edge markers on the output line 60. The transistors 327 and 336 are normally on, because the transistor 333 holds the transistor 336 on the latter transistor holds the transistor 327 on. A negative-going signal at the base of the transistor 327 turns of this transistor. When the transistor 327 turns off, the transistor 328 is turned on, and the transistor 336 is turned off because of the increase of the voltage on the base of the transistor 336. The transistor 336 holds the transistor 327 off after the input pulse goes positive. The capacitor 331 linearly discharges through the diode 338 and the current source transistor 333 for a predetermined period of time. When the base of the transistor 336 goes slightly negative, this transistor turns on and in turn turns on the transistor 327. Hence, the width of the output pulse is determined by how long the transistor 327 is turned off, and this period of time is controlled by the discharge of the capacitor 331. The discharge time of the capacitor 331 is controlled by circuit constants, the current source transistor 333 and the range transistor 340. In the high range, the transistor 340 is turned on by applying the potential —V2 to the range control line 133. In the high range, the duration of the trailing edge markers on the output line 60 is shorter than in the low range. If desired, a variable voltage may be applied to the base of the transistor 333 to vary the current through this transistor and, therefore, provide a variable control of the width of the trailing edge markers.

The trailing edge markers are applied through the line 62 to reset the negative peak read and hold circuit 16 in FIG. 8 in the same manner discussed in connection with FIG. 1. The negative peak read and hold circuit 16 is a complement of the positive peak read and hold circuit 15 in FIG. 6. The same is true of the negative peak isolation amplifier 31, the comparator 23, the inhibit circuit 53 and the latch circuit 49. The function switch 33 is substantially the same as the function switch 28.

Figure 8:
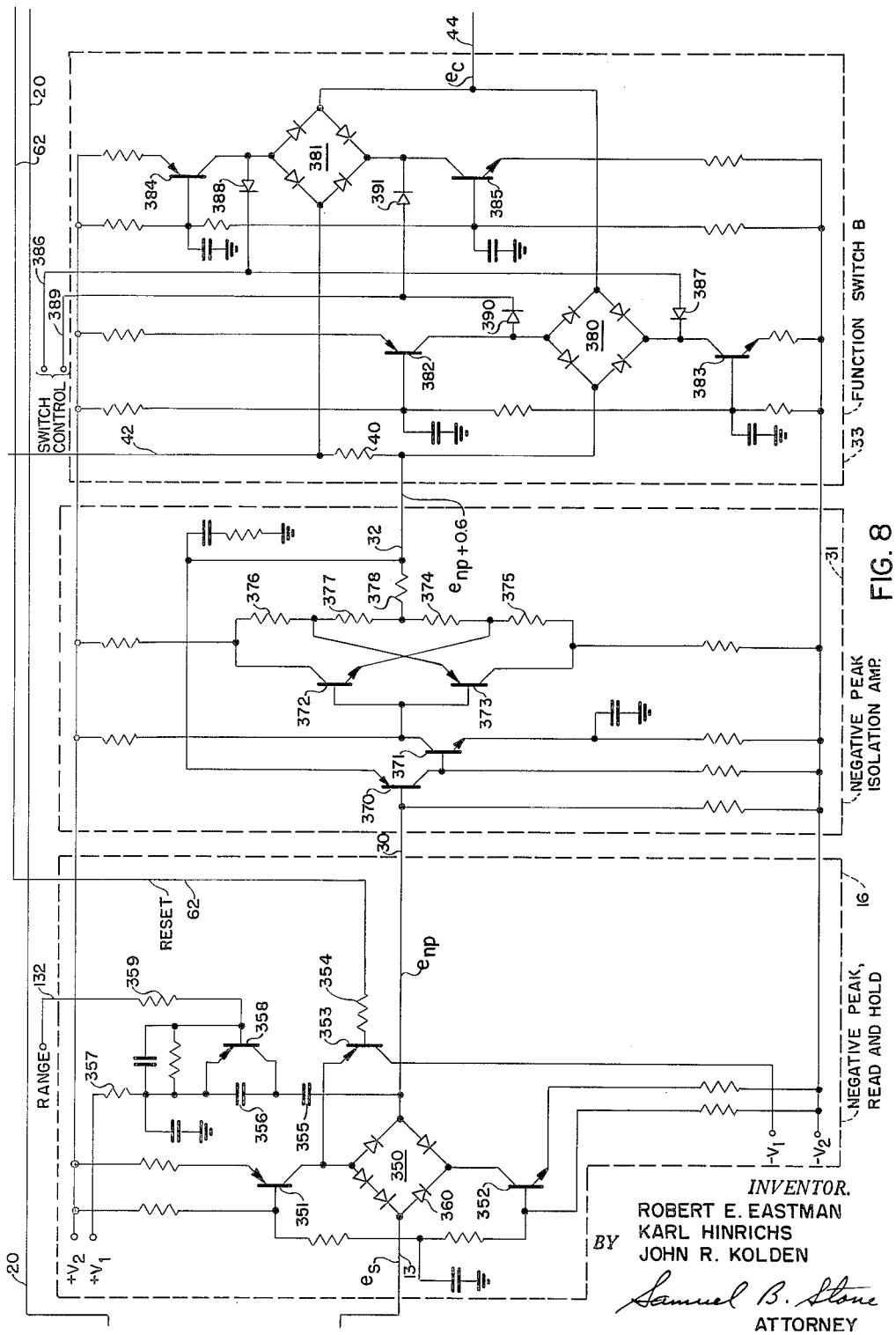

The negative peak read and hold circuit 16 in FIG. 8 includes a diode bridge 350 and current source transistors 351 and 352 connected thereto. The signal $e_s$ is applied from the input amplifier 11 in FIG. 5 through the line 13 to the left-hand terminal of the diode bridge 350. The emitter of an emitter-follower 353 is connected to the junction of the collector of the transistor 351 and the upper terminal of the diode bridge 350. The reset line 62 is connected through a resistance 354 to the base of the emitter-follower 353. The right-hand terminal of the diode bridge 350 is connected through capacitances 355 and 356, and a resistance 357 to the positive potential source V1. The emitter and collector of a range control transistor 358 are connected across the capacitor 356, and the range control line 132 is connected through a resistance 359 to the base of the transistor 358.

The negative peak read and hold circuit 16 functions to read and hold negative peaks of the signal $e_s$ in the same manner that the positive peak read and hold circuit 15 in FIG. 6 operates to read and hold positive peaks. A negative-going signal on the line 13 back biases a diode 360 in the diode bridge 350 thereby causing the capacitor 355 (and the capacitor 356 in the high range when the transistor 358 is off) to read the negative peaks of the input signal. When a reset signal is applied to the base of the transistor 353, the capacitor 355 discharges through the transistor 351 preparatory to reading a subsequent negative peak. During reset, the negative peak circuit 16 tracks slightly positive in the same manner as the positive peak circuit 15 tracks slightly negative.

The output signal $e_{np}$ of the negative peak read and hold circuit 16 is applied through the line 30 to the base of a transistor 370 in the negative peak isolation amplifier 31. The collector of the transistor 370 is connected to the base of a transistor 371. The collector of the transistor 371 is connected to the bases of complementary emitter-followers 372 and 373. The emitters of the transistors 372 and 373 are connected between the junctions of respective resistances 374 and 375, and 376 and 377. The junction of the resistances 374 and 377 is connected through a resistance 378 to the output line 32. The output line 32 is connected to the emitter of the transistor 370. The negative peak isolation amplifier 31 is a unity gain amplifier, and the base-emitter drop (+0.6 volt, for example) of the transistor 370 is added to the signal $e_{np}$. Hence, the output signal on the line 32 is $e_{np}+0.6$ volt.

The output of the negative peak isolation amplifier 31 is applied through the line 32 to the function switch 33. The line 32 is connected to a diode bridge 380, and through a resistance 40 to a diode bridge 381. Current source transistors 382 and 383 are connected with the diode bridge 380, and current source transistors 384 and 385 are connected with the diode bridge 381. A switch control line 386 is connected through a diode 387 to the lower terminal of the bridge 380, and through a diode 388 to the upper terminal of the bridge 381. A second switch control line 389 is connected through a diode 390 to the upper terminal of the bridge 380, and through a diode 391 to the lower terminal of the bridge 381. The right-hand terminals of the bridges 380 and 381 are connected to the output line 44.

The function switch 33 is operated by applying potentials to the switch control lines 386 and 389 to cause the diode bridges 380 or 381 to provide an output in the same manner as discussed in connection with the function switch 28 in FIG. 6. Table V below indicates the potentials applied to the switch control lines 386 and 389 and the resulting output signal $e_c$ for the different modes of operation.

TABLE V

| | PDM | PAM RZ | PAM NRZ |
|---|---|---|---|
| Control V: | | | |
| Line 386 | +V1 | —V1 | —V1 |
| Line 389 | —V1 | +V1 | +V1 |
| $e_c=$ | $\frac{1}{2}(e_{pp}+e_{np})$ | $e_{np}+0.6$ | $e_{np}+0.6$ |

It should be noted that any desired ratio of resistance values may be employed for the resistance divider 36 and 40 connected with the input of the function switches 28 and 33 to provide any desired ratio of input signals to the function switches. Furthermore, two dividers may be used to provide a different percentage of the signals $e_{pp}$ and $e_{np}$ for leading edge detection and trailing edge detection.

The signal $e_c$ is applied from the function switch 33 in FIG. 8 through the line 44 to the base of transistor 396 in the comparator 23 in FIG. 9. The signal $e_d$ is applied from the threshold control circuit 18 in FIG. 5 through the line 20 to the base of a transistor 397 in the comparator 23 in FIG. 9. The emitters of the transistors 396 and 397 are connected together by means of a potentiometer 398, and these transistors operate as a differential amplifier. The collectors of the transistors 396 and 397 are connected to the bases of respective transistors 399 and 400. The collectors of the transistors 399 and 400 are connected together through resistances 401 and 402. The junction of the resistances 401 and 402 is connected to the source —V2. The source —V2 is connected through a resistance 403 to the emitter of a current source transistor 404. The collector of the transistor 404 is connected to a variable tap on the potentiometer 398. The transistors 399 and 400 operate as a differential amplifier, and the transistor 404 functions as a current source to provide improved common-mode voltage rejection. The collector of the transistor 399 is connected through a line 405 and a resistance 406 to the base of the transistor 407. The collector of the transistor 407 is connected to the output line 47 of the comparator 23. The comparator 23 receives the input signals $e_c$ and $e_d$ on the respective input lines 44 and 20 and provides a difference output signal $e_{o2}$ on the output line 47.

The collector of the transistor 400 is connected through the line 52 and a resistance 410 to the base of a transistor 411. The inhibit line 141 is connected through a diode 412 to the collector of the transistor 411. The emitters of the transistors 407 and 411 are connected together. The collector of the transistor 411 is connected to the output line 58. When the inhibit circuit 53 is not inhibited, the transistors 407 and 411 function as a differential amplifier, and the complement of the signal on the line 47 is provided on the line 58. The line 47 is connected through a capacitor 408 to an Or circuit 416 in the latch 49, and the line 58 from the inhibit circuit 53 is connected through a capacitor 413 to the Or circuit 322 in the latch 48 in FIG. 7.

The Or circuit 416 in the latch 49 in FIG. 10 includes resistances 417 and 418, and diodes 419 and 420. The junction of the diodes 419 and 420 is connected to the base of a transistor 421. The collector of the transistor 421 is connected to the base of a transistor 422. A diode 423 is connected from the emitter of the transistor 422 to the collector of the transistor 421. The emitter of the transistor 422 also is connected through a capacitance 424, a resistance 425, a current source transistor 426 and resistances 427 and 428 to the positive potential source. The junction of the resistance 425 and the collector of the transistor 426 is connected to the base of a transistor 429. A diode 430 is connected across the resistance 425. The emitter and collector of a range control transistor 431 are connected across the resistance 428. The range control line 134 is connected through a resistance 432 to the base of the transistor 431. The junction of the emitter of the transistor 422 and the capacitor 424 is connected to the output line 61.

The latch 49 is triggered only on positive-going signals. These signals are supplied on the line 47 from the comparator 23 or on the line 57 from the inhibit circuit 51 in FIG. 7. When the signal on the base of the transistor 421 goes positive, this transistor turns off. When the transistor 421 turns off, the transistor 422 turns on and the transistor 429 turns off. When the transistor 429 turns off, it holds the transistor 421 off and the input signal to the base of the transistor 421 may terminate. The capacitor 424 charges in a different direction through the diode 430 and the current source transistor 426. After a predetermined period of time determined by the charging of the capacitor 424, the transistor 429 again turns on which in turn causes the transistor 421 to turn on. This operation of the latch 49 provides the leading edge markers on the output line 61. These leading edge markers also are applied through the line 63 to reset the positive peak read and hold circuit 15 in FIG. 6 as previously discussed.

A variable voltage may be applied to the base of the transistor 426 in the same manner as discussed in connection with the transistor 333 in FIG. 7 to control the width of the output markers. Additionally, variable voltages may be applied to the bases of the transistors 200 and 201 in the signal filter 14 in FIG. 5 to control the range of the signal filter. If desired, the signal filter may precede the input amplifier 11.

It now should be apparent that the present invention provides a transition detector in which variable slicing levels are utilized. The negative and positive transitions of the input signal are tracked, and the peak values of these signals are stored. Particular thresholds are selected for the different modes of operation and compared with the peak values of the signal to provide output markers indicative of the signal transitions.

Although particular components, frequencies of operation and frequency ranges have been discussed in connection with a specific example of a circuit constructed in accordance with the present invention, others may be utilized. Furthermore, it will be understood that although an exemplary embodiment of the present invention has been disclosed and discussed, other applications and circuit arrangements are possible and that the embodiment disclosed may be subjected to various changes, modifications and substitutions without necessarily departing from the spirit of the invention.

What is claimed is:

1. A device for detecting transitions of an input signal comprising, a threshold circuit, first means for applying said input signal to said threshold control circuit, first and second peak read and hold circuits, second means for applying said input signal to said first and second peak read and hold circuits, switch means connected with the outputs of said first and second peak read and hold circuits, first and second comparators connected with the outputs of said switch means and said threshold control circuit for comparing the input signals applied thereto and providing output signals indicative of the difference between the input signals thereto, latch means, and means connecting said comparators with said latch means whereby said latch means are triggered by predetermined inputs thereto to provide output signals indicative of the transitions of said input signal.

2. Apparatus for detecting the transitions of pulses in a pulse train comprising a first storage circuit having input means and output means, a second storage circuit having input means and output means, a threshold control circuit having input means and output means, first means applying said pulses to the input means of said first and second storage circuits and said threshold circuit, a first comparator having input means and output means, a second comparator having input means and output means, second means for selectively connecting desired portions of the output means of said first and second storage circuits and said threshold circuit to the input means of both said first and second comparators, a first latch means having input means and output means, a second latch means having input means and output means, and third means connecting the output means of said first and second comparators with the input means of said first and second latch means, whereby said first and second storage circuits periodically store maximum and minimum peak excursions, respectively, of said pulses, said first and second comparators compare said respective maximum and minimum peak excursions with outputs from the output means of said threshold circuit, and said first and second latch means provide output signals indicative of transitions of said pulses in response to predetermined output signals from said first and second comparators.

3. Apparatus as in claim 2 wherein said first and second storage circuits include capacitive means for storing the respective maximum and minimum peak excursions of said input pulses, and said second means includes switch means connnected to the input means of said first and second comparators.

4. Apparatus for detecting transistions of pulses in an input signal comprising first and second means for detecting and storing predetermined positive and negative excursions, respectively, of said pulses and to provide outputs indicative of said predetermined excursions, third means responsive to the input signal for generating threshold levels, fourth means connected with said first means for receiving a signal indicative of said positive excursions from said first means and having an output, fifth means connected with said second means for receiving signals indicative of said negative excursions and having an output, sixth means interconnecting the output of said fourth and fifth means, seventh means connected with the output of said fourth means and connected with said third means to receive a signal therefrom and to provide an output signal indicative of the difference between the input signals applied thereto, eighth means connected with the output of said fifth means and connected with said third means to receive a signal therefrom and to provide an output signal indicative of the difference between the input signals applied thereto.

ninth means connected with said seventh and eighth means responsive to particular output signals therefrom to provide output signals indicative of the leading and trailing edges of said input pulses, and tenth means connecting the ninth means with said first and second means to apply the signals indicative of the leading and trailing edges of said pulses to reset said first and second means.

5. Apparatus as in claim 4 wherein said ninth means includes first and second latch means and first and second inhibit means, said first latch means being connected with the output of said seventh means, said second latch means being connected with the output of said eighth means, said first inhibit means being connected with the seventh means to apply a signal to the second latch, and said second inhibit means being connected with said eighth means to apply a signal to said first latch means.

References Cited by the Examiner

UNITED STATES PATENTS

| | | | |
|---|---|---|---|
| 2,451,632 | 10/1948 | Oliver | 329—109 |
| 2,790,903 | 4/1957 | Kirkness et al. | 329—109 |
| 3,002,154 | 9/1961 | Schmitz et al. | 329—109 |
| 3,116,458 | 12/1963 | Margopoulos | 328—135 |
| 3,130,371 | 4/1964 | Copeland | 328—135 |

ARTHUR GAUSS, *Primary Examiner.*

DAVID J. GALVIN, JOHN W. HUCKERT, *Examiners.*